Patented Sept. 5, 1944

2,357,312

UNITED STATES PATENT OFFICE 2,357,312

METHOD OF PREPARING WHEAT GERM FOR USE IN BAKING

Josef Cryns, Kansas City, Mo., assignor to Jay Burns, Evanston, Ill.

No Drawing. Application March 30, 1940, Serial No. 326,954

5 Claims. (Cl. 99—93)

This invention concerns the baking industry and relates more particularly to the milling of wheat flour.

As a general object, this invention contemplates the provision of a stable wheat germ compound which may be stored, handled and shipped like any ordinary flour, and which may be used by the baker or housewife as any other baking ingredient or sold to mills for incorporation in their own white flour to augment the food value and improve the flavor of bread and other products baked therefrom.

In present day milling methods, the wheat kernel is passed between steel rollers where it is alternately ground and sifted many times. In the early stages of the process the miller does not attempt to extract the flour, but instead is concerned chiefly with the elimination of the husk or bran which is removed in a series of coarse grinding and sifting operations.

Included in the husk or bran thus removed is substantially the entire embryo of the wheat, commonly termed wheat germ. Although the germ forms but a small part of the wheat kernel, it is well known that it contains most of the rich flavor and food value of the wheat and that the vitamins B, G and E found in wheat are practically confined to the germ. Likewise the desirable mineral salts found in wheat are confined practically entirely to the wheat germ.

However, notwithstanding recognition of this fact, the milling industry adopted the Hungarian steel roller method by which substantially all of the wheat germ is eliminated. The adoption of this method of milling which excluded the most desirable part of the wheat kernel was induced by the instability against rancidity of all wheat flour containing the wheat germ and by the desire to produce a fine white flour.

The advantages of the germ were thus sacrificed in the interests of obtaining a more stable and whiter flour, and because no method was known by which the wheat germ could be milled into a stable, finely pulverized flour.

The failure of the art to heretofore devise a method of successfully milling the wheat germ is possibly attributable to the oily, elastic, tough fibrous structure of the germ which resisted all known methods of grinding; but unless the germ is completely pulverized, its rich wheat flavor is not released.

Attempts have been made in the past to make the wheat germ available to the baker in a commercially usable form. The most successful of these attempts has resulted in a wheat flour now commercially available which is quite stable as to keeping qualities, but which nevertheless has a very serious objection. It lacks uniform baking characteristics. Because the germ is milled as a constituent part of the kernel the proteolytic action of the enzymes contained primarily in the germ cannot be controlled.

This is explained as follows:

The proteins which are contained in wheat flour and in the wheat germ produce minute gas cells in bread dough and if the wall structure of these gas cells is left undisturbed the bread expands or rises in the customary manner. Consequently, the extent to which the bread rises is dependent upon the strength of the cell walls.

When only ordinary white flour is used little difficulty is experienced in maintaining a given balance between cell formation and proteolytic action. The baker is thus assured of uniform results. However, when flour containing wheat germ is used, the greater proteolytic action resulting from the disintegrating effect of the enzymes contained in the wheat germ interferes with normal cell formation and the resultant expansion of the dough mass. If the proteolytic action could be controlled the desired balance between it and cell formation might be retained, but where the germ is milled with the rest of the kernel, no known method exists by which the necessary controlling agent can be added.

This invention, therefore, has as another of its objects the provision of a method of milling and treating wheat germ for use as a baking and/or flour ingredient by which its proteolytic action may be controlled to a fine degree to thereby insure uniform baking characteristics.

Still another object of this invention resides in the provision of a stable compound of the character described, which in addition to pulverized wheat germ, contains only such ingredients as are commonly used in the baking of bread and other products.

With the above and other objects in view which will appear as the description proceeds, this invention resides in the novel product and process of producing it substantially as hereinafter described, and more particularly defined by the appended claims, it being understood that such changes in the precise embodiment of the hereindisclosed invention may be made as come within the scope of the claims.

The first step in the method of this invention consists in mixing a quantity of regular commercially pure wheat germ, which is available on the open market, with substantially an equal amount of crystal sugar (cane sugar). To this mixture is added either potassium bromate or potassium iodate or both. To promote the admixture of the potassium compound a quantity of pure pulverized calcium may be used as a vehicle for the potassium.

The proportions of potassium compound and calcium are approximately 10 grams of potassium compound to 2 pounds of calcium, while the proportion of potassium compound to the wheat germ-sugar mixture is approximately 10 grams to each 200 pounds of wheat germ-sugar mixture.

The entire mixture is then passed through a suitable grinder either in one step or in several successive stages to effect pulverization of the wheat germ. By mixing the wheat germ with the crystal sugar a conjoint action takes place which breaks up the wheat germ and gradually reduces it to the desired pulverized state.

The addition of the crystal sugar to the wheat germ therefore makes possible the pulverization of the germ without extracting the germ oil. In addition the sugar acts to preserve the sweetness of the germ and arrest rancidity.

Attention is directed to the fact that the use of sugar in this manner is not objectionable, as sugar is a common ingredient in all baked products.

Wheat germ compound milled in this manner is completely stable, so that it requires no special storage treatment to prevent rancidity and readily lends itself to blending with white flour in any desired proportion. Such a blended flour is vastly superior to any of the common varieties of "patent" flour due to its increased food value and its greatly improved flavor.

Hence, the product may be sold to the miller for incoporation by him in his own "patent" flour or it may be sold to the baker and housewife for direct use as a baking ingredient.

Either potassium bromate or potassium iodate or quantities of each may be used. The function of these potassium compounds is to control the proteolytic action of the enzymes contained in the wheat germ.

As hereinbefore stated, unless this proteolytic action is controlled so as to maintain a balance between it and cell formation in the dough there is no assurance to the baker of uniform baking characteristics. These enzymes exert a decomposing influence on the proteins and especially the wall structure of the minute gas cells produced thereby and destroy the same, with the result that proper cell formation and expansion in the dough mass is interfered with, unless the proteolytic action is controlled.

The potassium bromate and/or potassium idoate when used in the above amounts acts to regulate the proteolytic action of the enzymes and thus the cell structure is left undisturbed, and uniform baking characteristics are assured.

These potassium compounds are capable of being mixed directly with the wheat germ-sugar mixture, but used in the dry state it is preferable to first mix them with pulverized calcium. This follows from the fact that only a small quantity of the potassium compounds is necessary and difficulty ordinarily would be experienced in thoroughly mixing the same with the wheat germ-sugar mixture. The calcium, however, acts to evenly disperse the potassium compound throughout the entire body of the whole mixture and thus insures consistent and uniform control of the proteolytic action.

Dispersion is also more complete due to the fact that the calcium and potassium mixture is passed through the grinder together with the wheat germ and sugar. It is to be appreciated, however, that the calcium and potassium compound mixture may be added to the wheat germ-sugar mixture after pulverization of the same.

Another manner of introducing the potassium compounds is by spraying a solution thereof into the wheat germ mixture. Any suitable liquid vehicle may be used; water has been found to be satisfactory, and the time of spraying may be either before or after grinding. This method has the advantage of completing the function of the potassium compounds before the wheat germ compound is incorporated in the dough mix, as it is the moisture which releases the action of the potassium.

While the method hereinbefore described is completely satisfactory, if desired, part of the sugar content of the compound may be replaced by salt. As much as ten per cent (10%) of the sugar may be replaced by salt so that the salt content would be approximately five per cent (5%) of the entire mixture. The use of salt in this manner has been found to enhance the action of the potassium compound, especially when potassium bromate is used.

From the foregoing description it will be apparent that this invention provides a particularly valuable method of milling and treating wheat germ for use as a baking ingredient and whereby the true flavor and the nutrition afforded by the wheat germ is made available for use.

It is further apparent that except for the wheat germ, all of the ingredients used in the production of the product of this invention are now commonly used in the baking of bread and other bakery products.

What I claim as my invention is:

1. The hereindescribed method of treating wheat germ for use as an ingredient in the baking of bread which comprises: grinding the wheat germ together with substantially an equal amount of crystal sugar to facilitate pulverization of the germ.

2. A method of milling wheat germ characterized by the grinding of the wheat germ with a sweetening agent having hard crystalline characteristics so as to render the wheat germ susceptible to pulverization and in which the sweetening agent may be used in amounts substantially equal to the wheat germ to insure thorough pulverization thereof without detracting from the flavor of the germ.

3. A product suitable for use as a baking ingredient containing wheat germ as its major constituent and comprising at least 25% of sugar to render the product stable, said wheat germ and sugar having been ground from a mixture of commercial wheat germ and hard crystalline sugar whereby the sugar crystals act to reduce the wheat germ to a fine state of pulverization.

4. A pulverized baking product containing relatively large proportions of wheat germ and sugar, said wheat germ and sugar having been ground with the wheat germ in its commercial form and with the sugar in a hard crystalline form whereby the sugar actively assists in the pulverization of the wheat germ to a fineness such that the product is capable of being easily and thoroughly blended with bread dough.

5. A product suitable for use as a baking ingredient containing wheat germ as its major constituent and comprising at least 25% of sugar to render the product stable and potassium bromate in the proportion of approximately ten grams potassium bromate to 200 pounds of wheat germ and sugar, said wheat germ and sugar having been ground from a mixture of commercial wheat germ and hard crystalline sugar whereby the sugar crystals act to reduce the wheat germ to a fine state of pulverization.

JOSEF CRYNS.